United States Patent [19]

Chasco et al.

[11] Patent Number: 5,481,907
[45] Date of Patent: Jan. 9, 1996

[54] TIRE TESTING SYSTEM HAVING FOCUSED LINKS REDUCING COSINE ERRORS

[75] Inventors: David G. Chasco; Dennis J. Willis, both of Bloomington, Minn.

[73] Assignee: MTS Systems Corporation, Eden Prairie, Minn.

[21] Appl. No.: 268,951

[22] Filed: Jun. 30, 1994

Related U.S. Application Data

[63] Continuation-in-part of Ser. No. 166,093, Dec. 13, 1993, abandoned.

[51] Int. Cl.$^6$ .................................................. G01M 17/02
[52] U.S. Cl. ........................................... 73/146; 73/8
[58] Field of Search ........................................ 73/146, 8, 9

[56] References Cited

U.S. PATENT DOCUMENTS

| | | | |
|---|---|---|---|
| 3,977,243 | 8/1976 | Yamada et al. | 73/146 |
| 4,160,378 | 7/1979 | Himmler | 73/146 |
| 4,238,954 | 12/1980 | Langer | 73/146 |
| 4,305,300 | 12/1981 | Peterson et al. | 73/788 |
| 4,344,324 | 8/1982 | Langer | 73/146 |
| 4,499,759 | 2/1985 | Hull | 73/746 |
| 4,848,143 | 7/1989 | Ushikoshi | 73/146 |

OTHER PUBLICATIONS

Brochure: "TIRF in the making," Calspan Corporation, Buffalo N.Y. 14221 (undated).
Brochure: SRU Flat Belt Forec & Moment Machine, Sales Specification, Akron Standard Machinery Division, Nov. 1977.
"The Calspan Tire Research Facility: Design, Development and Initial Test Results," K. D. Bird and J. F. Martin, Society of Automotive engineers meeting, May 14–18, 1973.
"Development of a Flat Surface Tire Rolling Resistance Facility," S. E. Lloyd, Society of Automotive Engineers 1978 Passenger Car Meeting, Jun. 5–9, 1978.
Brochure: "Application Notes—Carriage Upgrade Package Enhances Use of Road Wheel Systems for Tire Tread Wear Testing", MTS Systems Corporation, 1991 (2 pages).

Primary Examiner—Richard Chilcot
Assistant Examiner—Joseph L. Felber
Attorney, Agent, or Firm—Westman, Champlin & Kelly

[57] ABSTRACT

An adjustable testing system for supporting a rotating tire against a roadway simulator includes a frame, wherein the tire is mounted on a side of the frame, and a moveable frame. A first linkage joins the moveable frame to the frame allowing the moveable frame to be displaced relative to the frame. A support member is used to mount a wheel of the tire, the support member being mounted to the moveable frame with a second linkage to allow movement of the support member relative to the moveable frame. The assembly is of a compact design for both the first linkage and the second linkage are characterized by two representative planes that intersect with each other on the same side of the frame.

26 Claims, 9 Drawing Sheets

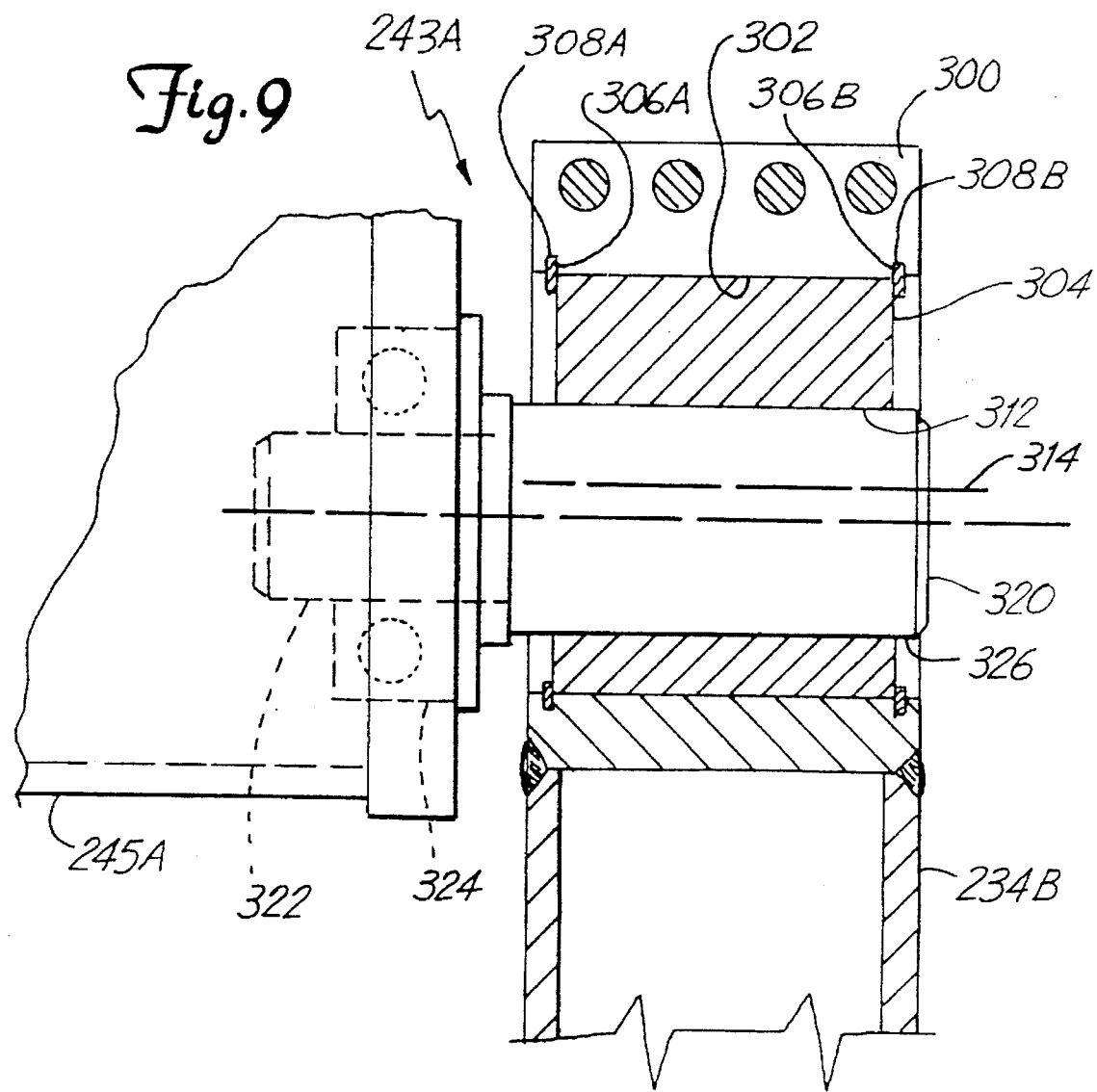

5,481,907

TIRE TESTING SYSTEM HAVING FOCUSED LINKS REDUCING COSINE ERRORS

CROSS REFERENCE TO RELATED APPLICATION

This application is a continuation-in-part of application Ser. No. 08/166,093, filed Dec. 13, 1993, now abandoned.

BACKGROUND OF THE INVENTION

The present invention relates to a tire testing system that positions a rotating tire on a roadway simulator. More particularly, the present invention provides a compact wheel positioning assembly having focused links.

The testing of automobile tires using a roadway simulator such as a drum or flat belt is well known. During the testing, the tire is rotated against an outer surface of the roadway simulator that simulates various road conditions such as concrete or blacktop. The tire is typically mounted to a wheel assembly, the wheel assembly being forced toward the roadway simulator in order to apply radial loads upon the tire to simulate the weight of an automobile.

The wheel assembly is mounted to an adjustable carriage for adjusting the position of the wheel assembly, and thus, the tire relative to the roadway simulator. By varying the angular placement of the tire on the roadway simulator, treadwear, static and dynamic forces and moments, and other parameters required by specific testing practices can be measured for various camber and slip (steering) positions. However, adjustable carriages of the prior art commonly include long links to control the position of the wheel assembly. These long links reduce the stiffness of the carriage, which limits the performance of the carriage and makes determination of true tire position and forces applied to the tire more difficult to obtain. In addition, the long links make the carriages quite bulky requiring excessive space in the plant or laboratory.

SUMMARY OF THE INVENTION

The present invention provides an adjustable wheel positioning assembly for supporting a wheel having a tire on a roadway simulator. The assembly includes a frame, wherein the wheel is mounted on a side of the frame, and a moveable frame. A first linkage joins the moveable frame to the frame allowing the moveable frame to be displaced relative to the frame. A support plate is used to mount a wheel spindle, the support plate being mounted to the moveable frame with a second linkage to allow movement of the support plate relative to the moveable frame. The assembly is of a compact design for both the first linkage and the second linkage are "focused links" wherein each linkage is characterized by two representative planes that intersect with each other, each set of representative planes intersecting on the same side of the frame.

In the embodiment illustrated, each of the linkages include two link members. For the first linkage, each link member is pivotally joined at a first end to the frame and pivotally joined at a second end to the moveable frame, while for the second linkage, each link member is pivotally joined at a first end to the moveable frame and at a second end to the support plate. Separate actuators connected between the frame and the moveable frame, and the moveable frame and the support plate allow the support plate to be displaced about two perpendicular axes.

In the preferred embodiment, the adjustable wheel positioning assembly is mounted to a stationary frame on adjustable slides. An actuator adjusts the position of the adjustable wheel positioning assembly, and thereby, the radial loading of the tire upon the roadway simulator to simulate the weight of an automobile. Angular displacement of the support plate relative to the moveable frame, and angular displacement of the moveable frame relative to the frame, changes the position of the tire on the roadway simulator to simulate various steering and camber positions.

BRIEF DESCRIPTION OF THE DRAWINGS

FIG. 2A is a sectional view taken along line 2A—2A in FIG. 2;

FIG. 9 is a sectional view of the adjustable pivot coupling taken along line 9—9 in FIG. 8.

DETAILED DESCRIPTION OF THE PREFERRED EMBODIMENTS

Figure 1:
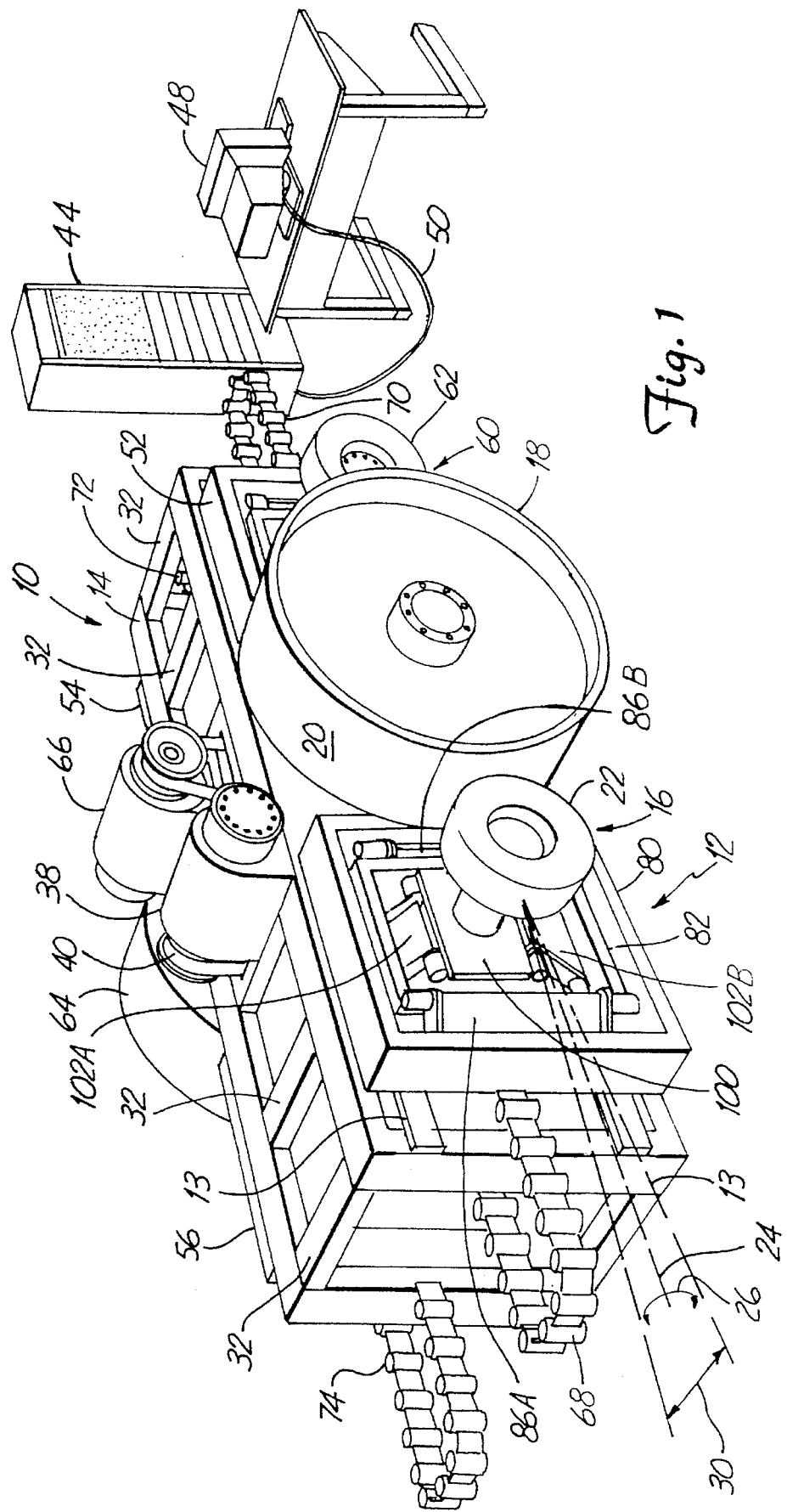
FIG. 1 is a perspective view of the present invention embodied in a tire testing system.

FIG. 1 illustrates a tire testing system 10 incorporating a first embodiment of an adjustable wheel positioning assembly 12 of the present invention. The adjustable wheel positioning assembly 12 is mounted and slides on rails 13 which in turn are fixed to a stationary frame 14. The adjustable wheel positioning assembly 12 supports a wheel assembly 16 against a road wheel 18. An outer perimeter surface 20 of the road wheel 18 contacts the tread of a tire 22 of the wheel assembly 16. The outer surface 20 simulates various road surfaces such as black top or concrete. Tire radial loads are applied using a suitable servohydraulically controlled hydraulic actuator, schematically illustrated in FIG. 2 at 15, attached to the adjustable wheel positioning assembly 12 and the frame 14. The adjustable wheel positioning assembly 12 adjusts the position of the tire 22 on the outer surface 20. In the embodiment illustrated, the adjustable wheel positioning assembly 12 adjusts the slip angle or steer of the tire 22, which is the rotation of the tire 22 about an axis 24 in a direction indicated by double arrow 26, the axis 24 being generally perpendicular to the contact patch of the tire 22 with the road surface 20. In addition, the adjustable wheel positioning assembly 12 adjusts the camber angle of the tire 22 relative to the outer surface 20. As illustrated, the camber angle is pivotal displacement of the tire 22 and axis 24 on the road wheel 18 to and away from the frame 14 in a direction indicated by double arrow 30.

The frame 14 includes suitable cross members 32 such that the frame 14 self-reacts all forces applied to the tire 22 by the system so that a special facility foundation is not required. A drive/braking unit 38 rotates or loads the roadwheel 18 through a drive belt 40 applying power or braking loads selectively to the roadwheel 18. A direct drive or gear box would also be acceptable. A control system 44 having suitable analog and digital controls monitors system performance and provides command instructions to adjust speed of the roadwheel 18, positioning of the tire 22 on the roadwheel 18 by the adjustable positioning of assembly 12, and location of the adjustable wheel positioning assembly 12 on the frame 14. An operator control center 48 connected to the control system 44 through signal lines 50 provides an interface for an operator.

In a preferred embodiment, three additional adjustable tire positioning assemblies 52, 54 and 56 are provided to allow the system 10 to test four tires simultaneously. As illustrated, the adjustable wheel positioning assembly 52 is mounted to the frame 14 with slides, not shown, on a side opposite adjustable wheel positioning assembly 12. The adjustable wheel positioning assembly 52 supports a wheel assembly 60 so that a tire 62 mounted thereto contacts the roadwheel 18. The adjustable tire testing assemblies 54 and 56 are mounted to the frame 14 in a similar manner on opposite sides of a second roadwheel 64. The second roadwheel 64 is rotated or loaded by a drive/braking unit 66 similar to drive/braking unit 38. Flexible conduits 68, 70, 72 and 74 enclose data signal and control lines, not shown, allowing each of the adjustable tire testing assemblies 12, 52, 54 and 56, respectively, to move relative to the frame 14.

Figure 2:
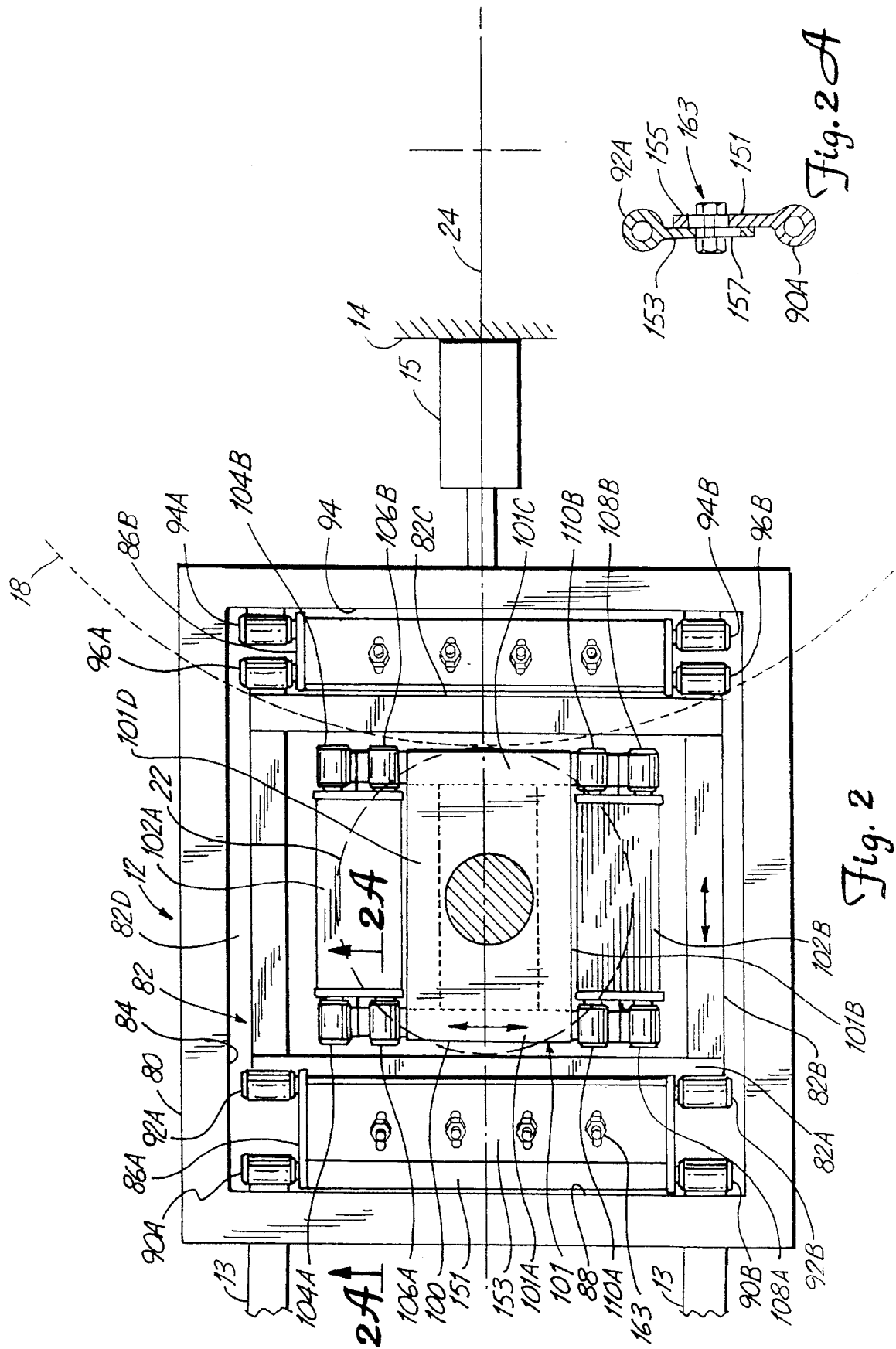
FIG. 2 is a side elevational view of the present invention.

Referring also to FIG. 2, the adjustable wheel positioning assembly 12 generally includes a frame member 80, an intermediate frame member 82 that moves relative to the frame member 80, and a support plate 100 that moves relative to the intermediate member 82. The support plate 100 is not connected directly to the frame 80, but rather, only to the intermediate member 82. With the wheel assembly 16 mounted to the support plate 100 as illustrated in FIG. 1, displacement of the support plate 100 relative to the intermediate frame member 82 using pivotal links 102A and 102B described below causes the wheel assembly 16 and support plate 100 to rotate about the axis 24 in the direction indicated by double arrow 26. Similarly, the intermediate frame member 82 is joined to the frame 80 with pivotal links 86A and 86B, described below. The pivotal links 86A and 86B allow pivotal displacement of the wheel assembly 16, the support plate 100 and the intermediate frame member 82 on the roadwheel 18 to and away from the frame 14 in a direction indicated by double arrow 30.

Figure 4:
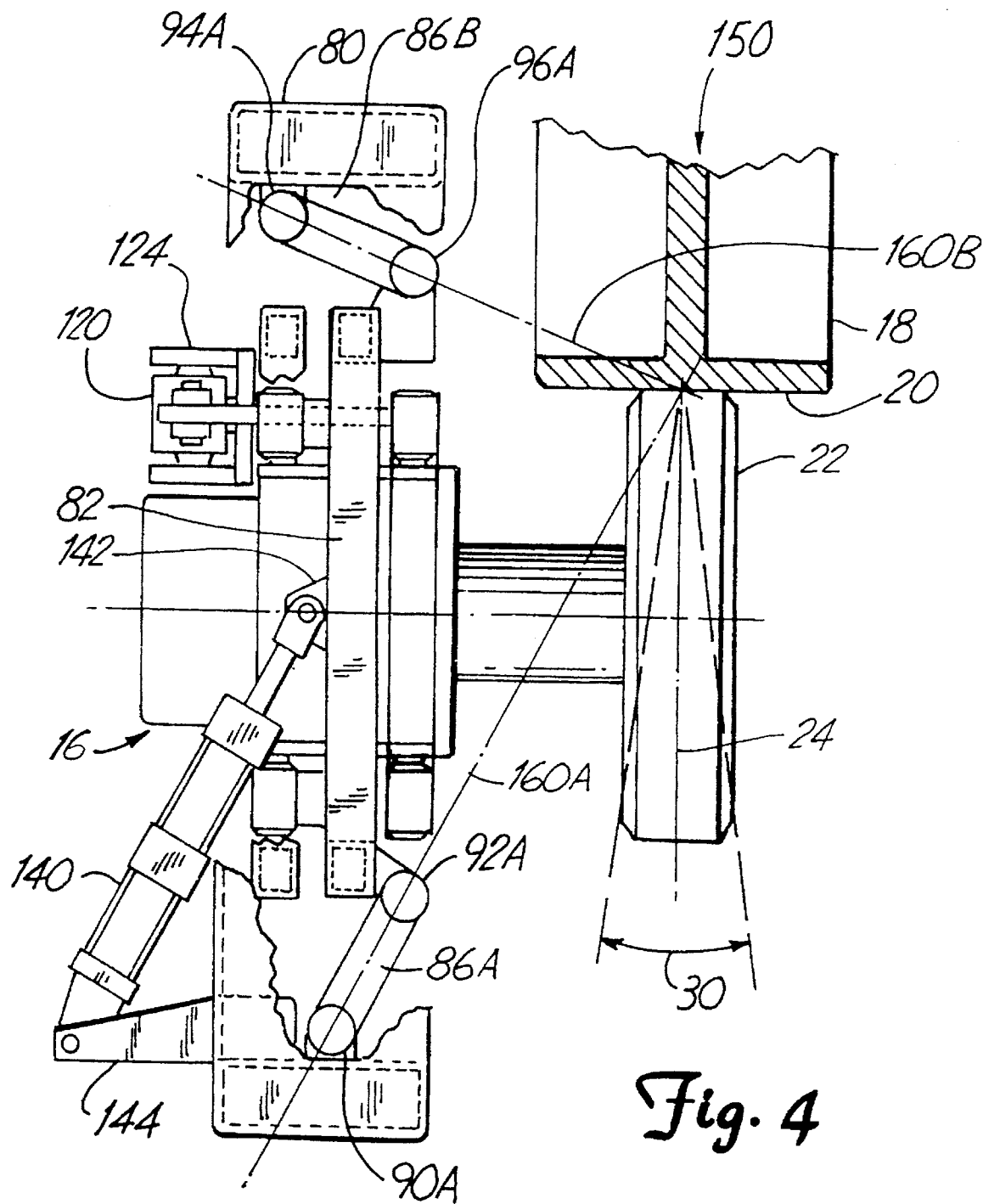
FIG. 4 is a top plan view of the present invention with parts broken away.

Referring also to FIG. 4, the intermediate frame member 82 is pivotally joined to the frame member 80 with the pair of opposed links 86A and 86B. The intermediate frame member 82 is positioned within an inner perimeter 84 of the frame 80 and comprises a box frame formed from frame portions 82A, 82B, 82C and 82D. The first link 86A is pivotally connected to the frame 80 on inner wall 88 with suitable pivot connections 90A and 90B. The first link 86A is further connected to the frame portion 82A with suitable pivot connections 92A and 92B. On a side opposite inner wall 88, the second link 86B is connected to inner wall 94 with suitable pivot connections 94A and 94B, the second link 86B being in turn connected to frame portion 82C with suitable pivot connections 96A and 96B.

The support plate 100 supports the wheel assembly 16 and moves relative to the intermediate frame member 82. The support plate 100 is joined to a box frame 101 formed from frame portions 101A, 101B, 101C and 101D. The pair of second links 102A and 102B pivotally connect the support plate 100 and the box frame 101 to the intermediate frame member 82.

The second links 102A and 102B are positioned to rotate the wheel assembly 16 about the axis 24. The link 102A is pivotally connected to frame member 82D with suitable pivot connections 104A and 104B and connected to the box frame 101 with suitable pivot connections 106A and 106B. In a similar fashion, the link 102B is connected to the frame member 82B with pivot connections 108A and 108B and to the box frame 101 on a side opposite the link 102A with pivot connections 110A and 110B.

Figure 3:
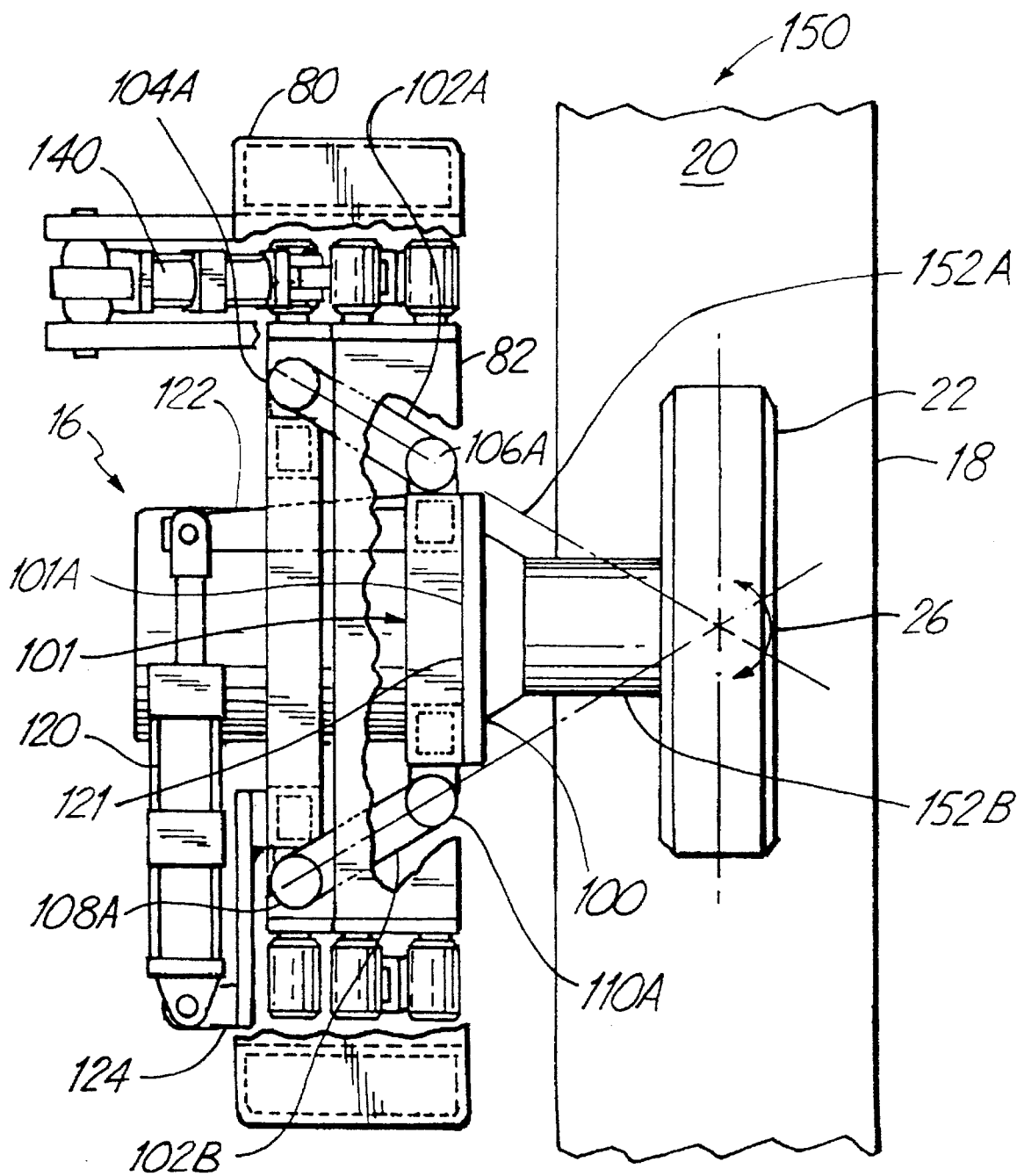
FIG. 3 is a end view of the present invention with parts broken away.

Referring to FIGS. 3 and 4, actuators 120 and 140 initiate displacement of the wheel assembly 16. As illustrated in FIG. 3, the wheel assembly 16 is mounted to the support plate 100, projecting through an aperture 121 therein and through the intermediate frame member 82 and frame 80. The actuator 120 is connected to a bracket 122 that is attached to the box frame 101. At an opposite end, the actuator 120 is connected to a bracket 124 that is attached to the intermediate frame member 82. Operation of the actuator 120 pivots the wheel assembly 16, box frame 101 and plate 100 relative to the intermediate frame member 82 using the second links 102A and 102B to cause rotation of the tire 22 about the axis 24.

Referring to FIG. 4, the actuator 140 adjusts the camber angle indicated by double arrow 30 of the tire 22 and wheel assembly 16 by displacing the intermediate frame member 82 relative to the frame 80 using the links 86A and 86B. The actuator 140 is connected to a bracket 142 mounted to the intermediate frame member 82. At an end opposite the bracket 142, the actuator 140 is connected to a suitable bracket 144 that in turn is securely attached to the frame 80. Displacement caused by the actuator 140 causes the wheel assembly 16 and tire 22 to pivot relative to the frame 80 thereby adjusting the camber angle of the tire 22 on the outer surface 20. However, since the steering actuator 120 is nested or effectively mounted inside the links 86A and 86B, the actuator 120 is not subject to cosine errors as the links 86A and 86B move through various camber angles, thereby minimizing crosstalk.

The adjustable wheel positioning assembly 12 is a compact structure due to the mounting of the links 86A, 86B, 102A and 102B. Specifically, each pair of links 86A and 86B, and, 102A and 102B, are tilted inwardly and form "focused links" with representative planes intersecting on a side 150 of frame 80 that includes the tire 22. Referring to FIG. 3, each of the links 102A and 102B includes a representative plane 152A and 152B, respectively. The representative plane 152A is defined by the pivot connections 104A, 104B, 106A and 106B, while the representative plane 152B is defined by the pivot connections 108A, 108B, 110A and 110B. Since the pivot connections 106A and 106B, and, 110A and 110B are connected to the box frame 101 and inwardly of the pivot connections 104A and 104B, and, 108A and 108B, respectively, the representative planes 152A and 152B intersect on the side 150 of the frame 80, preferably on the axis 24.

Similarly, representative planes 160A and 160B of the links 86A and 86B intersect on the side 150 of the frame 80, as illustrated in FIG. 4. The representative plane 160A is defined by the pivot connections 90A, 90B, 92A and 92B, while the representative plane 160B is defined by the pivot connections 94A, 94B, 96A and 96B. Since the pivot connections 92A and 92B, and, 96A and 96B are connected to the intermediate frame 82 and inwardly of the pivot connections 90A and 90B, and, 94A and 94B, respectively, the representative planes 160A and 160B intersect on the side 150. Preferably, as illustrated, the link 86A is longer than link 86B so that intersection of representative planes 160A and 160B is at the contact patch of a nominally loaded tire 22. This approach minimizes changes in the effective diameter of the tire, thereby minimizing crosstalk between tire radial load control and camber angle.

In the embodiment illustrated, the length of the links 86A and 86B are adjustable so that the focus of the links can be adjusted to the loaded radius of the tire to be tested. In other words, the pivot axis for pivot connections 92A and 92B is moved closer to the axis of the wheel assembly 16 than the pivot axis for pivot connections 96A and 96B. Referring to FIGS. 2 and 2A, the link 86A includes two plate members 151 and 153. The plate member 151 is connected to the pivot connections 90A and 90B, while the plate member 153 is connected to the pivot connections 92A and 92B. Each plate member 151 and 153 includes slots 155 and 157, respectively. Fasteners 163 project through the slots 155 and 157 to secure the plate members 151 and 153 together. With link 86B similarly constructed, the length of each link 86A and 86B can be adjusted to locate the intersection of representative planes 160A and 160B at the contact patch for the tire to be tested. Alternatively, if the focus of links 86A and 86B is fixed (i.e., the lengths of links 86A and 86B are fixed), the tire's loaded radius will not be the same from tire to tire and the contact patch will move a small amount for a given camber angle. This movement however will not affect test quality because the movement will be across the crown of the roadwheel 18, thereby not affecting measured/controlled tire radial load.

Figure 5:
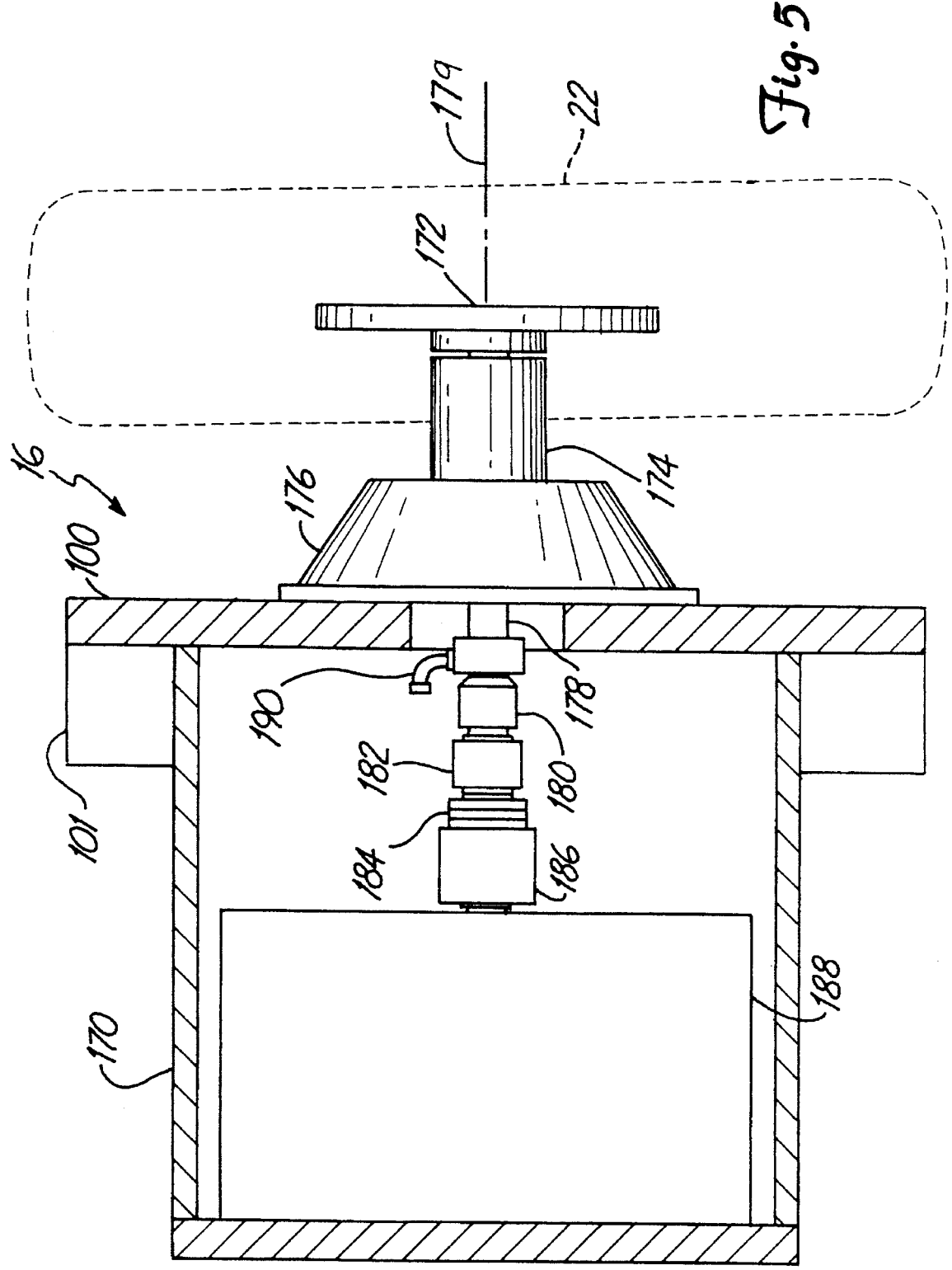
FIG. 5 is a schematic sectional view of a wheel assembly.

FIG. 5 schematically illustrates the wheel assembly 16. The wheel assembly 16 includes a housing 170 mounted to the support plate 100 and the box frame 101. An adapter plate 172 supports the rim of the wheel 22 and is mounted to a spindle bearing assembly 174. The spindle bearing assembly 174 is joined to a suitable spindle transducer assembly 176 to measure loads related to steer and camber. These loads are proportional to forces applied on a spindle shaft 178 in the directions along the axis 24 (normal to the paper) and along a rotational axis 179 of the tire 22. The spindle transducer assembly 176 provides representative force output signals to the control center 44. Although illustrated as being secured to the outside of the housing 170, the spindle transducer 176 can be placed at any convenient position to measure forces upon the tire 22. For example, the spindle transducer could also be secured within the housing 170.

The shaft 178 is joined to a splined coupling 180 which in turn is connected to a flexible coupling 182. A slip ring assembly 184 allows access to sensors positioned on the tire 22 and joins the flexible coupling to a torque transducer 186 which provides an output signal to the control center 44 proportional to the torque on the shaft 178. The torque transducer 186 is connected to a suitable brake assembly 188 that is secured to the housing 170. The brake assembly 188 receives command instructions from the control center 44 in order to load the tire 22 during rotation on the roadwheel 18. A rotary union 190 is connected to an air pump, not shown, and directs air through the shaft 178 and spindle bearing assembly 174 to a tire valve, not shown. The air pump receives instructions from the control center 44 to adjust the pressure of the tire 22 during rotation. If desired, the assembly 188 could include a spindle motor to drive the tire 22 and rotate the roadwheel 18.

Figure 6:
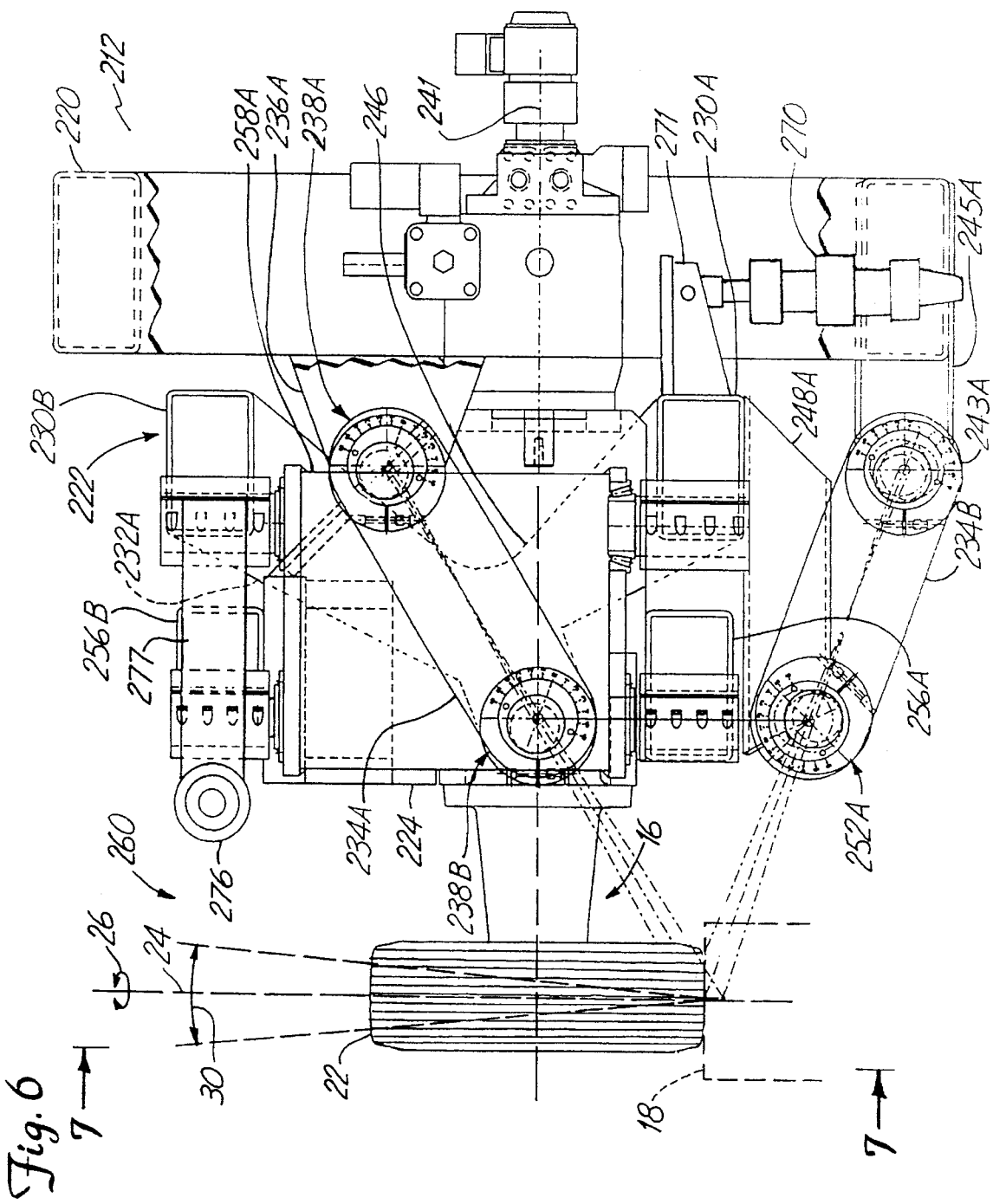
FIG. 6 is a top plan view of a second embodiment of the present invention with parts broken away.
Figure 7:
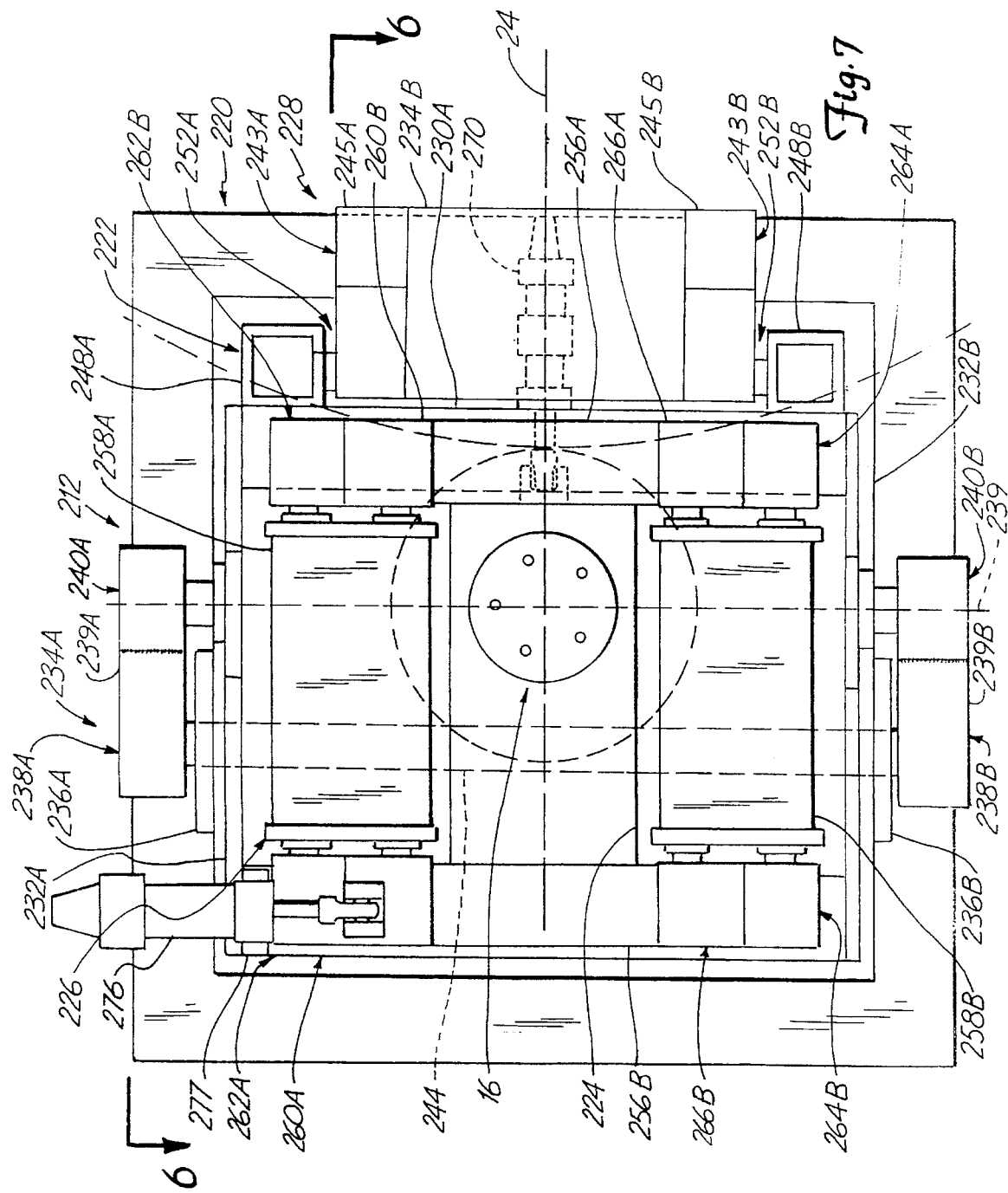
FIG. 7 is a side elevational view of the second embodiment.

FIGS. 6 and 7 illustrate a second embodiment of the adjustable wheel positioning assembly of the present invention generally at 212. Like the embodiment described above, the adjustable wheel positioning assembly 212 adjusts the slip angle or steer of the tire 22 about the axis 24 in a direction indicated by double arrow 26 and the camber angle of the tire 22 in a direction indicated by double arrow 30.

The adjustable wheel positioning assembly 212 generally includes a frame member 220, an intermediate frame member 222 that moves relative to the frame member 220, and a support plate 224 that moves relative to the intermediate member 222. The support plate 224 is not connected directly to the frame member 220, but rather, only to the intermediate frame member 222. With the wheel assembly 16 mounted to the support plate 224, displacement of the support plate 224 relative to the intermediate frame member 222 using a linkage assembly 226 comprising pivotal links 258A and 258B, described below, causes the wheel assembly 16 and the support plate 224 to rotate about the axis 24 in the direction indicated by double arrow 26. Similarly, the intermediate frame member 222 is joined to the frame 220 with a linkage assembly 228 comprising pivotal links 234A and 234B, described below. The pivotal links 234A and 234B allow pivotal displacement of the wheel assembly 16, the support plate 224 and the intermediate frame member 222 on the road wheel 18 in a direction indicated by double arrow 30 in FIG. 7.

The intermediate frame member 222 includes beam members 230A and 230B joined together by end plates 232A and 232B of which 232A is illustrated in dashed lines in FIG. 6. Each link 234A and 234B pivotally join the intermediate frame member 222 to the frame 220. The link 234A is pivotally joined to the frame 220 on support brackets 236A and 236B with pivot connection 238A and 238B, respectively. The link 234A includes arms 239A and 239B, which are pivotally connected to the end plates 232A and 232B with pivot connections 240A and 240B, respectively. A shaft 244 provides structural rigidity between the arms 239A and 239B. Since the shaft 244 is disposed between the intermediate frame member 222 and the frame 220, the end plates 232A and 232B each include a recessed portion 246, as illustrated in FIG. 6 with respect to end plate 232A, in order to provide clearance between the end plates 232A and 232B and the shaft 244 during movement of the intermediate frame member 222.

The intermediate frame 222 includes supports 248A and 248B that are joined to the beam member 230A and extend toward the tire 22. The link 234B is pivotally connected to the supports 248A and 248B using pivot connections 252A and 252B, respectively. Pivot connections 243A and 243B pivotally join the link 234B to the frame 220 with support beams 245A and 245B.

Referring to FIG. 7, it should be understood that a pivot axis 239 as defined by the pivot connections 240A and 240B, preferably, intersects with an axis 241 of the wheel assembly 16. Location of the pivot axis 239 of the link assembly 228 on or substantially near the axis 241 minimizes crosstalk between camber and steer displacements.

The support plate 224 supports the wheel assembly 16 and moves relative to the intermediate frame member 222. The support plate 224 is joined to support members 256A and 256B. The pair of second links 258A and 258B pivotally connect the support plate 224 and the support members 256A and 256B to the intermediate frame member 222.

The second links 258A and 258B are positioned to rotate the wheel assembly 16 about the axis 24. The link 258A is pivotally connected to the support members 256A and 256B with pivot connections 260A and 260B, respectively. The link 258A is also pivotally connected to beam members 230A and 230B with pivot connections 262A and 262B, respectively. Similarly, the link 258B is connected to the intermediate frame 222 with pivot connections 264A and 264B and to the support members 256A and 256B on a side opposite the link 256A with pivot connections 266A and 266B.

The adjustable wheel positioning assembly 212 is a compact structure due to the mounting of the links 258A and 258B, and the links 234A and 234B. Like the links 102A and 102B described above, the links 234A and 234B include representative planes (defined by pivot connections 238A, 238B, 240A, 240B; and, 243A, 243B, 252A, 252B) that intersect on a side 260 of the frame 220 that includes the tire 22, preferably, on the axis 24. Similarly, the links 258A and 258B include representative planes (defined by pivot connections 260A, 260B, 262A, 262B; and, 264A, 264B, 266A, 266B) that intersect on the side 260 of the frame 220, as illustrated in FIG. 6.

An actuator 270 having a first end connected to the frame 220 and second end connected a bracket 271 of the intermediate frame 222 controls movement of the intermediate frame 222 with respect to the frame 220 in the direction indicated by double arrow 30. An actuator 276 having a first end connected to the intermediate frame 222 through a support 277 (FIG. 6) and a second end connected to the support member 256B controls movement of the support plate 224 relative to intermediate frame 222 in the direction indicated by arrow 26.

Figure 8:
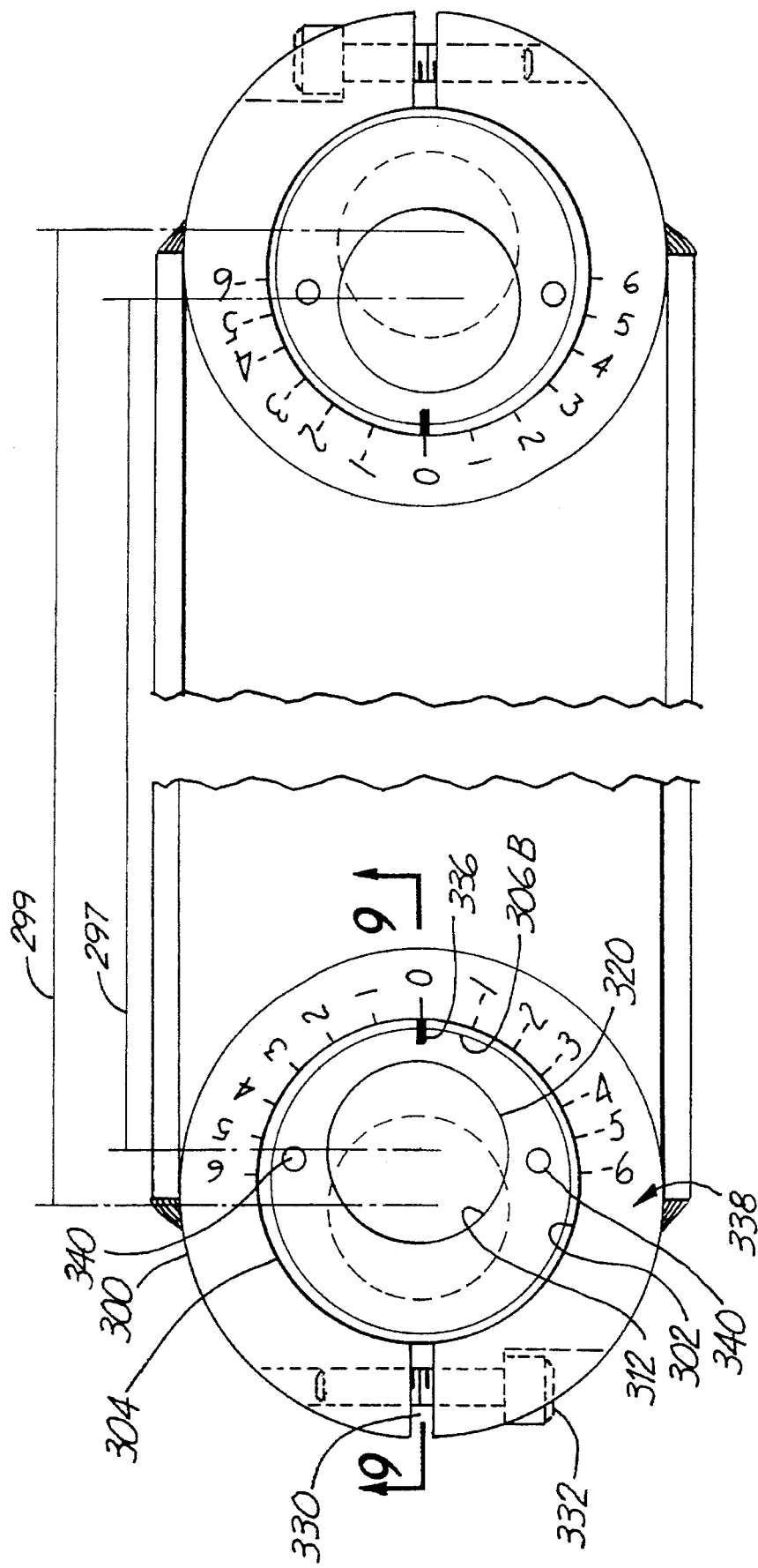
FIG. 8 is a side view of an adjustable pivot coupling.

In a preferred embodiment, the effective length of each of the links 234A, 234B, 258A and 258B is adjustable in order to calibrate the wheel positioning assembly 200 for the tire 22 being tested. Referring to FIG. 8, as used herein, "effective length" is defined as the linear distance between the pivot axes of each corresponding link. By adjustably fixing the location of one or both of the pivot axes, the effective length is adjustable between a minimum distance illustrated by double arrow 297 and a maximum distance illustrated by double arrow 299.

FIGS. 8 and 9 illustrate components present in the pivot connections used on links 234A, 234B, 258A and 258B using the pivot connection 243A by way of example. The pivot connection 243A includes an outer cylindrical housing 300 having an inner cylindrical aperture 302. A sleeve 304 is disposed in the cylindrical aperture 302. Locking rings 306A and 306B located in inner annular grooves 308A and 308B, respectively, prevent axial movement of the sleeve 304 with respect to the outer housing 300. The sleeve 304 includes a cylindrical aperture 312 that is eccentrically offset from a center axis 314 of the housing 300.

A pivot shaft 320 has a first portion 322 mounted in the support beam 245A. The portion 322 rotates in suitable bearing assembly 324 secured to the support beam 245A. A second portion 326 of the pivot shaft 320 is inserted in the aperture 312 of the sleeve 304. In operation, the position of the pivot 320 shaft with respect to the link 234B is adjusted by rotating the sleeve 304 within the aperture 302, and thus rotating the aperture 312 about the axis 314.

As illustrated in FIG. 8, a slot 330 extends from an outer surface of the housing 300 to the aperture 302. Fasteners 332 form a clamp from the opposed portions of the housing 300 to fix the sleeve 304 within the aperture 302. An index mark 336 on the sleeve 304 and a suitable scale 338 on the housing 300 are used to accurately change the positions of the shaft 320 within the housing 300 and thereby the effective length of the link 234B. In the embodiment illustrated, suitable apertures 340 are provided in the sleeve and are used to turn the sleeve 304 using a tool such as a spanner wrench, not shown.

In the embodiment illustrated in FIGS. 8 and 9, the effective length of the link 234B is adjusted by changing the position of the pivot shaft or shafts with respect to the link. It is to be understood that the effective length of the links 234A, 234B, 258A and 258B could also be changed by using eccentric sleeves positioned in the corresponding support members rather than in the link. Specifically, the pivot shaft bearing assemblies would be positioned in the links so that the distance between the pivot shafts with respect to the links are fixed rather than adjustable as described above. By then rotating the eccentric sleeves in the support members, the support members are either brought closer together or moved farther apart, while the distance between pivot shafts of the links remain fixed.

In summary, the present invention provides an adjustable wheel positioning assembly well suited for applications such as supporting a wheel assembly in a testing system. The adjustable position assembly includes two focused links. The focused links allow the assembly to be very compact.

Although the present invention has been described with reference to preferred embodiments, workers skilled in the art will recognize that changes may be made in form and detail without departing from the spirit and scope of the invention.

What is claimed is:

1. A wheel positioning assembly for supporting a wheel relative to a roadway simulator, the assembly comprising:
   a support frame, wherein the wheel is mounted on a side of the support frame;
   a moveable frame;
   first linkage means for joining the moveable frame to the support frame, the first linkage means defining a first set of representative planes that intersect on the side of the support frame having the wheel;
   a support member for supporting the wheel; and
   second linkage means for joining the support member to the moveable frame, the second linkage means defining a second set of representative planes that intersect on the side of the support frame having the wheel.

2. The wheel positioning assembly of claim 1 wherein the first linkage comprises:
   a link member having a first end and a second end, the first end being pivotally connected to the support frame for movement about a first pivot axis and the second end being pivotally connected to the moveable frame for movement about a second pivot axis; and
   means for adjusting a distance between the first pivot axis and the second pivot axis.

3. The wheel positioning assembly of claim 2 wherein the link member includes a first portion and a second portion, and wherein the means for adjusting comprises connection means for connecting the first portion to the second portion to obtain the distance.

4. The wheel positioning assembly of claim 2 wherein the means for adjusting comprises a housing and a sleeve adjustably fixed in the housing, the sleeve having an aperture that is offset from a center axis of the sleeve, one of the pivot axes extending through the aperture.

5. The wheel positioning assembly of claim 4 wherein the housing is mounted to an end of the link member.

6. The wheel positioning assembly of claim 4 wherein the housing comprises a cylindrical member having a cylindrical aperture and a slot extending from an outer surface to the cylindrical aperture, and further comprising a fastener to adjust a width of the slot to secure the sleeve in the housing.

7. The wheel positioning assembly of claim 4 wherein the means for adjusting comprises a second housing and a second sleeve adjustably fixed in the second housing, the second sleeve having an aperture that is offset from a center axis of the second sleeve, one of the pivot axes extending through the second aperture.

8. The wheel positioning assembly of claim 1 wherein the wheel rotates about a wheel axis and the first linkage means comprises:

a first link member having a first end and a second end, the first end being pivotally connected to the support frame on a first pivot axis and the second end being pivotally connected to the moveable frame on a second pivot axis; and a second link member having a third end and a fourth end, the third end being pivotally connected to the support frame on a third pivot axis and the fourth end being pivotally connected to the moveable frame on a fourth pivot axis; and wherein the second pivot axis is positioned closer to the wheel axis than the fourth pivot axis.

9. The wheel positioning assembly of claim 8 wherein the second pivot axis intersects with the wheel axis.

10. The wheel positioning assembly of claim 9 and further comprising means for adjusting a distance between the first pivot axis and the second pivot axis.

11. The wheel positioning assembly of claim 10 wherein the means for adjusting comprises a housing and a sleeve adjustably fixed in the housing, the sleeve having an aperture that is offset from a center axis of the sleeve, one of the pivot axes extending through the aperture.

12. The wheel positioning assembly of claim 1 wherein the wheel is engagable with the roadway simulator to form a contact patch and wherein the second linkage means rotates the wheel about an axis extending through the contact patch and wherein the first set of representative planes intersect on the axis.

13. The wheel positioning assembly of claim 12 wherein the wheel is rotatable about a wheel axis and wherein the first linkage means is joined to the moveable frame to define a set of two moveable frame pivot axes and wherein one of the two moveable frame pivot axes intersects with the wheel axis.

14. The wheel positioning assembly of claim 12 wherein the first set of representative planes intersect on the contact patch.

15. A testing system comprising:

a roadway simulator;

a support frame positioned adjacent the roadway simulator, wherein a wheel assembly is mounted on a side of the support frame and is supported on the roadway simulator;

a moveable frame;

first linkage means for joining the moveable frame to the support frame, the first linkage means defining a first set of representative planes that intersect on the side of the support frame having a wheel of the wheel assembly;

a support member for mounting the wheel assembly; and second linkage means for joining the support member to the moveable frame, the second linkage means defining a second set of representative planes that intersect on the side of the support frame having the wheel.

16. The testing system of claim 15 wherein the first linkage comprises:

a link member having a first end and a second end, the first end being pivotally connected to the support frame for movement about a first pivot axis and the second end being pivotally connected to the moveable frame for movement about a second pivot axis; and means for adjusting a distance between the first pivot axis and the second pivot axis.

17. The testing system of claim 16 wherein the link member includes a first portion and a second portion, and wherein the means for adjusting comprises connection means for connecting the first portion to the second portion to obtain the distance.

18. The testing system of claim 16 wherein the means for adjusting comprises a housing and a sleeve adjustably fixed in the housing, the sleeve having an aperture that is offset from a center axis of the sleeve, one of the pivot axes extending through the aperture.

19. The testing system of claim 18 wherein the housing is mounted to an end of the link member.

20. The testing system of claim 18 wherein the housing comprises a cylindrical member having a cylindrical aperture and a slot extending from an outer surface to the cylindrical aperture, and further comprising a fastener to adjust a width of the slot to secure the sleeve in the housing.

21. The testing system of claim 18 wherein the means for adjusting comprises a second housing and a second sleeve adjustably fixed in the second housing, the second sleeve having an aperture that is offset from a center axis of the second sleeve, one of the pivot axes extending through the second aperture.

22. The testing system of claim 15 wherein the first linkage means comprises:

a first link member having a first end and a second end, the first end being pivotally connected to the support frame on a first pivot axis and the second end being pivotally connected to the moveable frame on a second pivot axis; and a second link member having a third end and a fourth end, the third end being pivotally connected to the support frame on a third pivot axis and the fourth end being pivotally connected to the moveable frame on a fourth pivot axis.

23. The testing system of claim 22 wherein the wheel rotates about a wheel axis, and wherein the second pivot axis is positioned closer to the wheel axis than the fourth pivot axis.

24. The testing system of claim 23 wherein the second pivot axis intersects with the wheel axis.

25. The testing system of claim 24 and further comprising means for adjusting a distance between the first pivot axis and the second pivot axis.

26. The testing system of claim 25 wherein the means for adjusting comprises a housing and a sleeve adjustably fixed in the housing, the sleeve having an aperture that is offset from a center axis of the sleeve, one of the pivot axes extending through the aperture.

* * * * *

UNITED STATES PATENT AND TRADEMARK OFFICE
CERTIFICATE OF CORRECTION

PATENT NO. : 5,481,907
DATED : January 9, 1996
INVENTOR(S) : David G. Chasco et al.

It is certified that error appears in the above-indentified patent and that said Letters Patent is hereby corrected as shown below:

On the title page, item:

[56] References Cited

OTHER PUBLICATIONS

Second Publication, replace "forec" with --force--.

Signed and Sealed this

Sixteenth Day of July, 1996

Attest:

BRUCE LEHMAN

Attesting Officer      Commissioner of Patents and Trademarks